United States Patent
Tenny

(10) Patent No.: US 11,659,515 B2
(45) Date of Patent: May 23, 2023

(54) POSITIONING METHODS FACILITATED BY A SERVER UE

(71) Applicant: MEDIATEK Singapore Pte. Ltd., Singapore (SG)

(72) Inventor: Nathan Edward Tenny, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 14 days.

(21) Appl. No.: 17/345,340

(22) Filed: Jun. 11, 2021

(65) Prior Publication Data

US 2022/0015059 A1 Jan. 13, 2022

Related U.S. Application Data

(60) Provisional application No. 63/050,896, filed on Jul. 13, 2020.

(51) Int. Cl.
*H04W 64/00* (2009.01)
*H04W 24/10* (2009.01)
*H04W 92/18* (2009.01)

(52) U.S. Cl.
CPC ......... *H04W 64/006* (2013.01); *H04W 24/10* (2013.01); *H04W 92/18* (2013.01)

(58) Field of Classification Search
CPC ... H04W 64/00; H04W 64/006; H04W 24/10; H04W 92/18; H04W 76/14; H04W 88/04; H04W 4/02; G01S 1/042; G01S 5/0072; G01S 5/0236
See application file for complete search history.

(56) References Cited

U.S. PATENT DOCUMENTS

| 2017/0212206 A1 | 7/2017 | Kim et al. ............ G01S 5/0072 |
| 2017/0331670 A1 | 11/2017 | Parkvall et al. .... H04L 41/0233 |
| 2021/0297206 A1* | 9/2021 | Manolakos ....... H04W 72/0406 |
| 2022/0015057 A1* | 1/2022 | Bao ....................... H04W 64/00 |

FOREIGN PATENT DOCUMENTS

| WO | WO/2021/092813 | * | 5/2012 |
| WO | WO/2020/064120 | * | 4/2020 |

OTHER PUBLICATIONS

Taiwan IPO, office action for the Taiwanese patent application 110124873 (no English translation is available) dated Apr. 8, 2022 (10 pages).
3GPP "Technical Specification, 3rd Generation Partnership Project; Technical Specification Group Radio Access Network; LTE Positioning Protocol (LPP) (Release 16)", 3GPP TS 37.355 V16.0.0, dated Mar. 2020 (281 pages).

* cited by examiner

*Primary Examiner* — Siu M Lee
(74) *Attorney, Agent, or Firm* — Imperium Patent Works; Zheng Jin

(57) ABSTRACT

Methods of positioning UEs based on a sidelink interface are proposed, in an environment where the locations of multiple UEs may not be known to one another. The positioning methods are facilitated by a distinguished server UE, which may store information about the locations and/or configurations of one or more peer UEs and function as a positioning server to provide assistance data, collect measurements, and in some cases compute a location estimate for one or more peer UEs.

18 Claims, 6 Drawing Sheets

POSITIONING METHODS FACILITATED BY A SERVER UE

CROSS REFERENCE TO RELATED APPLICATIONS

This application claims priority under 35 U.S.C. § 119 from U.S. Provisional Application No. 63/050,896, entitled "Positioning Methods Facilitated by a Server UE," filed on Jul. 13, 2020, the subject matter of which is incorporated herein by reference.

TECHNICAL FIELD

The disclosed embodiments relate generally to wireless communications system, and, more particularly, to positioning methods utilizing sidelinks by a server UE in NR mobile communication networks.

BACKGROUND

Third generation partnership project (3GPP) and Long-Term Evolution (LTE) mobile telecommunication systems provide high data rate, lower latency and improved system performances. In 3GPP LTE networks, an evolved universal terrestrial radio access network (E-UTRAN) includes a plurality of base stations, e.g., evolved Node-Bs (eNBs) communicating with a plurality of mobile stations referred as user equipments (UEs). The Next Generation Mobile Network (NGMN) board has decided to focus the future NGMN activities on end-to-end requirements for 5G new radio (NR) systems. In 5G NR systems, the base stations are referred to as qNodeBs (qNBs). The 5G cellular architecture introduced sidelink (i.e., direct communication from one UE to another UE without passing through the network infrastructure) using the NR radio design as part of 3GPP Rel-16, specifically targeting vehicle-to-everything (V2X) communication.

When a group of UEs communicate via a sidelink interface, there is an opportunity to use the sidelink signals to estimate the locations of the UEs, either in absolute terms (e.g. a latitude/longitude position estimate) or relative to each other (e.g. a range or displacement relative to one or more other UEs). Such location estimation may be useful in a variety of use cases, including, for example, a vehicular platoon in which each vehicle attempts to maintain a target distance from the vehicle ahead of it.

However, a group of UEs communicating via sidelink may be in cellular network coverage, out of cellular network coverage, or in a so-called "partial-coverage" scenario in which some UEs are in network coverage while others are out. Particularly in the out-of-coverage and partial-coverage scenarios, existing methods of positioning based on communication with a server in the cellular network may not be feasible. Further, instrumenting all UEs with knowledge of one another's positions to facilitate this process is infeasible in large groups of moving UEs and may incur excessive overhead due to transmitting high-precision location information in a many-to-many fashion. A solution is sought.

SUMMARY

Methods of positioning user equipments (UEs) based on a sidelink interface are proposed, in an environment where the locations of multiple UEs may not be known to one another. A distinguished UE may function as a "server UE" for positioning purposes, allowing a reduction in the necessary sidelink signalling to support positioning as well as control of the distribution of information about the various peer UEs. The positioning methods are facilitated by the distinguished server UE, which may store information about the locations and/or configurations of one or more peer UEs and function as a positioning server to provide assistance data, collect measurements, and in some cases compute a location estimate for one or more peer UEs, e.g., a target UE.

In one embodiment, a method of target-initiated positioning for a target mobile device via sidelink interface is proposed. A target UE sends, to a server UE, a request for a first set of assistance data over a sidelink interface. The target UE receives, from the server UE, an assistance data message comprising a second set of assistance data over the sidelink interface. The target UE measures, based at least in part on the contents of the second set of assistance data, one or more positioning reference signals from one or more peer UEs. The second set of assistance data comprises configuration information of the one or more positioning reference signals from the one or more peer UEs.

In another embodiment, a method of server-based positioning with reference signals sent from a target mobile device via sidelink interface is proposed. A server UE sends, to a target UE, a message comprising a configuration for transmitting a first set of reference signals over a sidelink interface. The server UE sends, to each of one or more peer UEs, a message comprising a configuration for measuring a second set of reference signals. The server UE receives, from the one or more peer UEs, measurement results of the second set of reference signals. The server UE computes, based at least in part on the contents of the measurement results, a location estimate for the target UE.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
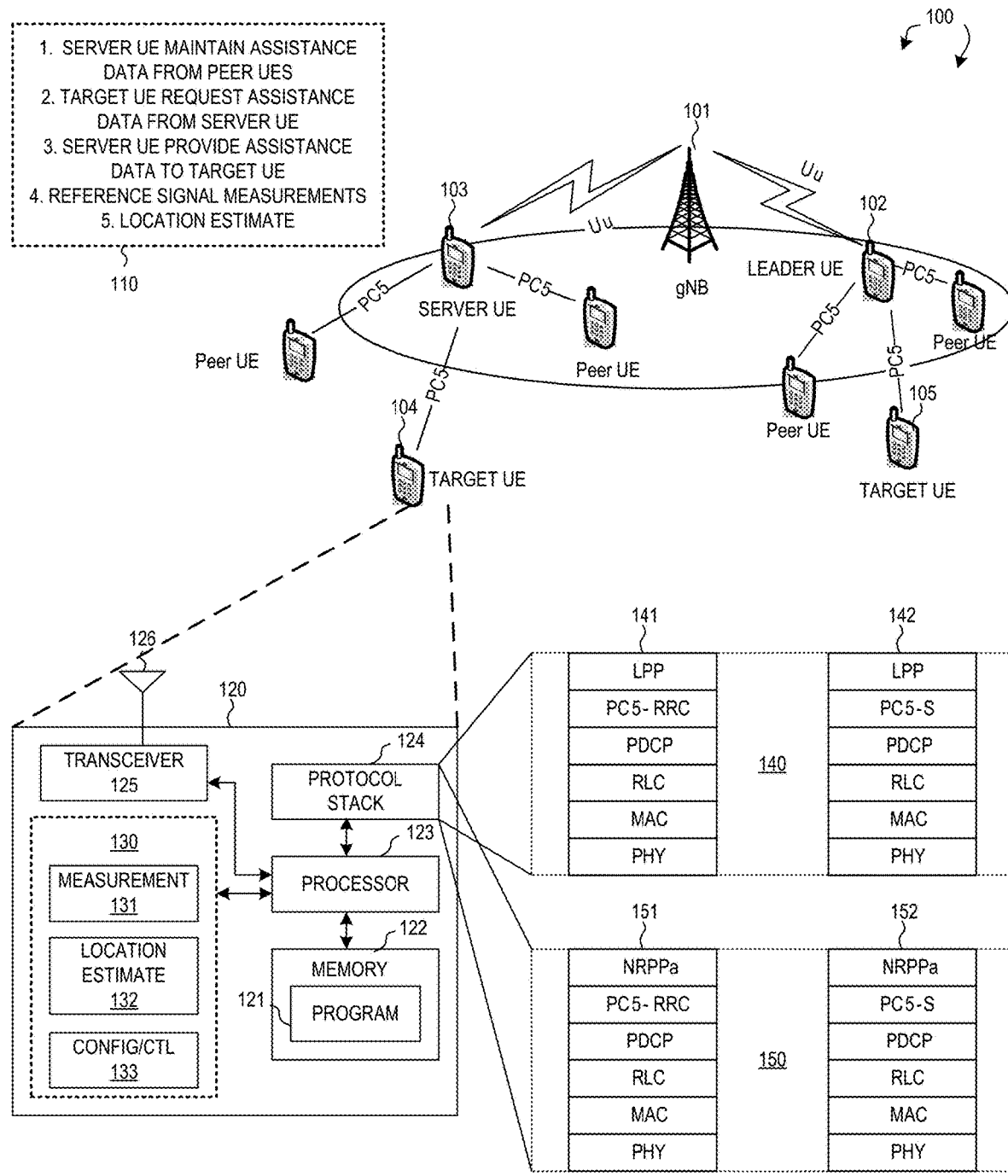
FIG. 1 illustrates a group of user equipments (UEs) and simplified block diagrams with an identified server UE that facilitates positioning for other target UEs in a mobile communication network in accordance with one novel aspect.

FIG. 1 illustrates a group of user equipments (UEs) with an identified server UE that facilitates positioning for other UEs in a mobile communication network 100 in accordance with one novel aspect. Mobile communication network 100 comprises a base station gNB 101 and a group of UEs. The group of UEs communicate with one another via a sidelink interface (also referred to as a PC5 interface), with at least one distinguished UE (e.g., UE 102), which may, for instance, function as a leader or coordinator of the group. The sidelink communications among the UEs may comprise one or more services, and may take place via unicast, groupcast, or broadcast signalling, or a combination thereof. The distinguished leader UE may be preconfigured or determined dynamically; for instance, a platoon of vehicles enabled for sidelink communication may consider whichever vehicle is in front of the platoon as the leader of the group, a set of UEs in the service area of a UE-type roadside unit (RSU) may recognise the RSU as a leader or coordinator, or a set of remote UEs served by a single relay UE may recognise the relay UE as a leader or coordinator. Some or all of the UEs in the group may be out of coverage of a cellular network; in some cases, the distinguished UE may be in coverage of a cellular network while some or all of the other UEs are out of coverage, and in such cases the distinguished UE may be used by the other UEs as a point of access to the network (e.g., a relaying relationship in which the relay UE provides network access for remote UEs).

FIG. 1 shows an example of a group of UEs with an identified leader UE, e.g., leader UE 102, in a partial-coverage scenario in which some of the UEs of the group are in coverage of a cellular network while others are out of coverage. In this example, the leader UE 102 communicates with the cellular network (gNB 101) over a Uu interface, and with the other UEs in the group over a PC5 (sidelink) interface. In some examples, the UEs in the group may also communicate directly with one another over a PC5 interface (not shown in FIG. 1). In addition, some UEs of the group that are in cellular coverage may communicate with the cellular network on a Uu interface as well as communicating with other UEs of the group over a PC5 interface (not shown in FIG. 1). When the group of UEs communicate via a sidelink interface, there is an opportunity to use the sidelink signals to estimate the locations of a to-be-positioned target UE. However, in the out-of-coverage and partial-coverage scenarios, existing methods of positioning based on communication with a server in the cellular network may not be feasible. Further, instrumenting all UEs with knowledge of one another's positions to facilitate this process is infeasible in large groups of moving UEs and may incur excessive overhead due to transmitting high-precision location information in a many-to-many fashion.

In accordance with one novel aspect, methods for a distinguished UE, e.g., leader UE 102, to function as a "server UE" for positioning a target UE over sidelink interface are proposed. This allows a reduction in the necessary sidelink signalling to support positioning as well as control of the distribution of information about the various peer UEs. Alternatively, the distinguished UE in the group may have no special role as a leader or coordinator, but supports positioning functions as a server UE, e.g., server UE 103. This distinguished server UE 103 may, for example, have access to information about all the peer UEs in the group, such as the configurations and estimated locations of the peer UEs. As depicted by 110, leader UE 102 or server UE 103 may support some of the functions of a positioning server for a to-be-positioned target UE 104 or target UE 105, including the maintenance (step 1) and distribution (step 3) of assistance data upon request from target UE (step 2) and/or the computation of location estimates for the target UE (step 5) in its group after reference signal measurements (step 4). In some embodiments, the computation of location estimate (step 5) may be a function of the server UE, while in other embodiments it may be a function of the target UE. In some embodiments, the measurement of reference signals (step 4) may be a function of the target UE, while in other embodiments it may be a function of the server UE and/or the peer UEs. Multiple positioning approaches are proposed, including server-assisted, or server-based, where the positioning reference signals are sent from peer UEs (and/or the server UE) or from the target UE, and where the location estimate is calculated by the server UE or by the target UE.

FIG. 1 further shows a simplified block diagram of a server UE and/or a target UE 120 that carry out certain embodiments of the present invention. UE 120 comprises memory 121, a processor 123, a protocol stack 124, an RF transceiver 125 coupled with antenna 126, and functional circuitry 130 which may further comprise some or all of a measurement module 131, a location estimation module 132, and a control and configuration module 133. RF transceiver module 125, coupled with antenna 126, receives RF signals from the antenna, converts them to baseband signals and sends them to processor 123. RF transceiver 125 also receives baseband signals from the processor, converts them to RF signals, and sends out to antenna 126. Processor 123 processes received baseband signals and invokes different functional modules and circuits to perform features in wireless device 120. Memory 121 stores program instructions and data 122 to control the operations of mobile device 120. The different modules and functional circuitry can be implemented and configured in software, firmware, hardware, and any combination thereof. The functional modules, when executed by processors 123 via program instructions 122 contained in memory 121, interwork with each other to allow the network device to perform positioning for the target UE. Each functional circuitry may be implemented using a processor and corresponding program instructions. Note that it is possible that not every target UE contains a measurement module, for example, because the target UE might only support positioning using methods where the target UE transmits the reference signals. Similarly, the target UE might only support server-based positioning and not contain a location estimation module.

In the proposed positioning operations, there is a need to transport signalling messages for positioning purposes between UEs over the sidelink interface. For instance, UEs must be given configurations of reference signals, instructed to take measurements, provided with assistance data, and so on. In the art on the Uu interface, communication between a UE and a positioning server typically uses LTE positioning protocol (LPP), which is transported over various air-interface and network-interface protocols. These transporting protocols are typically not available over a sidelink interface. Similarly, in the existing art, network nodes involved in positioning measurements, such as gNodeBs, may communicate with a positioning server using the NR positioning protocol A (NRPPa), which is transported over various network-interface protocols. In the context of sidelink positioning, the information conveyed by LPP and NRPPa messages (for instance, assistance data, reference signal configurations, measurement results, and so on) still needs to be propagated among the involved UEs, and it may be considered to reuse the LPP and/or NRPPa protocols for this purpose. However, transport of these protocols must be adapted to the sidelink interface.

Two potential protocol stacks for transport of LPP over a sidelink interface are depicted by 140. In the first protocol stack (141), LPP messages are transported via the PC5-RRC protocol, a control-plane protocol for sidelink communication. PC5-RRC is further transported by a well-known set of underlying protocols: packet data convergence protocol (PDCP), radio link control (RLC), medium access control (MAC), and physical layer (PHY). In the second protocol stack (142), LPP messages are transported via the PC5-S protocol, which in turn is transported by the same set of underlying protocols: PDCP, RLC, MAC, and PHY. Two potential protocol stacks for transport of NRPPa over a sidelink interface are depicted by 150. In the first protocol stack (151), NRPPa messages are transported via the PC5-RRC protocol. PC5-RRC is further transported by PDCP, RLC, MAC, and PHY layers. In the second protocol stack (152), NRPPa messages are transported via the PC5-S protocol, which in turn is transported by the same set of underlying protocols: PDCP, RLC, MAC, and PHY.

UEs in a group are presumed to have some capability for positioning based on sidelink signals, e.g., the ability to take measurements of positioning reference signals (PRSs) that may be transmitted on the sidelink. Such measurements may be used, for instance, to determine the range between two UEs, the direction of a vector between two UEs, and so on. The capability of the individual UEs may not extend to actual position determination based on the measurements; for example, they may be able to measure (absolute or relative) times of arrival for sidelink reference signals, but depend on the functionality of a positioning server to translate those timing measurements into a location estimate. An example of a positioning server in the existing art is a location management function (LMF) in a cellular core network.

In addition, some or all of the UEs may have the ability to determine their location by other means than sidelink measurements, such as global navigation satellite system (GNSS) measurements and/or measurements of signals of a cellular network. At any given moment, a particular UE—even if equipped with the ability to determine its own location—may or may not be able to make location measurements, and thus may or may not know its estimated location in practice. For example, a UE that depends on GNSS for positioning may not be able to receive signals from GNSS satellites while the UE is in a tunnel or otherwise has an obstructed view of the sky. Thus, a UE in the group that cannot determine its own location directly may be able to determine its location relative to other UEs in the group whose locations are known, and thus infer a location estimate for itself. Individual UEs may or may not have the ability to generate a complete location estimate for themselves; similar to the situation described above for sidelink measurements, a UE may depend on a server such as an LMF to translate measurements into a location estimate. In some examples, a UE may be able to estimate its own position based on some types of measurements, such as measurements of GNSS signals, but not based on other types of measurements, such as timing measurements of signals from a cellular network.

Figure 2:
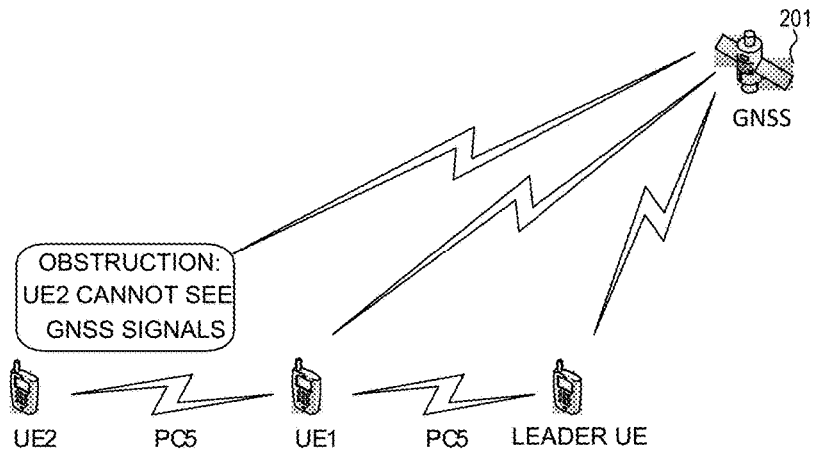
FIG. 2 shows a group of UEs with varying abilities to position themselves.

FIG. 2 shows a group of UEs with varying abilities to position themselves. The group may represent the UEs involved in a specific service (for instance, a platooning service or a relaying service), or it may represent a set of UEs in proximity with common visibility to one another, e.g., the set of all UEs visible to the leader UE. It should be appreciated that a group of UEs may include any number of UEs. In FIG. 2, the leader UE, UE1, and UE2 are all in communication via a PC5 interface. In addition to the links shown in FIG. 2, UE2 may be in communication via a PC5 interface to the leader UE. UE1 and the leader UE have visibility to a GNSS constellation 201, allowing them to use ordinary GNSS techniques to determine their own locations; but UE2's visibility to the GNSS constellation is obstructed, meaning that UE2 must rely on other methods to determine its location. In such a situation, measurements on the PC5 links to UE1 and/or the leader UE may provide the needed information to determine the location of UE2. For example, UE2 may measure a round-trip time (RTT), a receive-transmit (Rx-Tx) time difference measurement, an angle of arrival (AoA), an angle of departure (AoD), a time of arrival (TOA), a time difference of arrival (TDOA), one or more carrier phases, and/or other characteristics of one or more signals carried on the PC5 interface. Such measurements, together with the known positions of UE1 and/or the leader UE, may be sufficient for a location estimate of UE2. If one or more UEs of the group (for example, UE1 and the leader UE) announce their locations (as determined by GNSS measurements), UE2 may be able to take measurements on the PC5 interface and compute its own location estimate.

Figure 3:
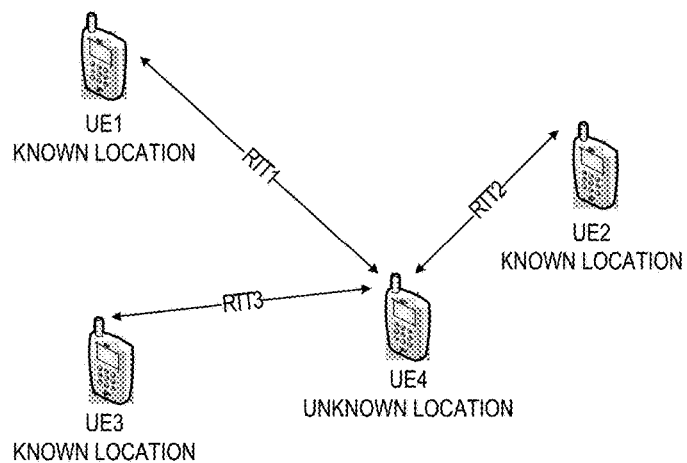
FIG. 3 shows a group of UEs communicating over PC5 interface and corresponding positioning approach, using round-trip time (RTT) measurements as an example of a positioning measurement, for UEs with unknown location.

FIG. 3 shows an example in which UE1, UE2, UE3, and UE4 are in communication via a PC5 interface, and UE4 takes RTT measurements towards the other UEs to determine an estimate of its own location. UE4 is assumed to know the locations of UE1, UE2, and UE3; this information may be available by various means, such as transmissions from the involved UEs themselves, transmissions from a positioning server that manages location information of the involved UEs, and so on. UE4 may initiate RTT measurements towards UE1, UE2, and UE3, and use the measured RTTs as estimates of the ranges from UE4 to each of the peer UEs. Based on the known locations of UE1, UE2, and UE3, and the ranges based on the measured RTT1, RTT2, and RTT3, UE4 may then compute (by a process of trilateration, for example) an estimate of its own location. The RTT measurements may rely on techniques known in the art, such as determining the propagation time of a round-trip transmission based on the initial transmission time, the final reception time, and an Rx-Tx time measurement that accounts for the delay between the two legs of the round-trip transmission. In some cases, the RTT measurements may combine measurements taken by UE4 itself with measurements taken by the peer UEs UE1/UE2/UE3. Alternative or additional measurements (AoA or TDOA measurements, for instance) may also be used to compute or refine the location estimate. This approach to computing the position of UE4 may be referred to as a UE-based or target-based location estimate (that is, based at the particular UE to be positioned).

Figure 4:
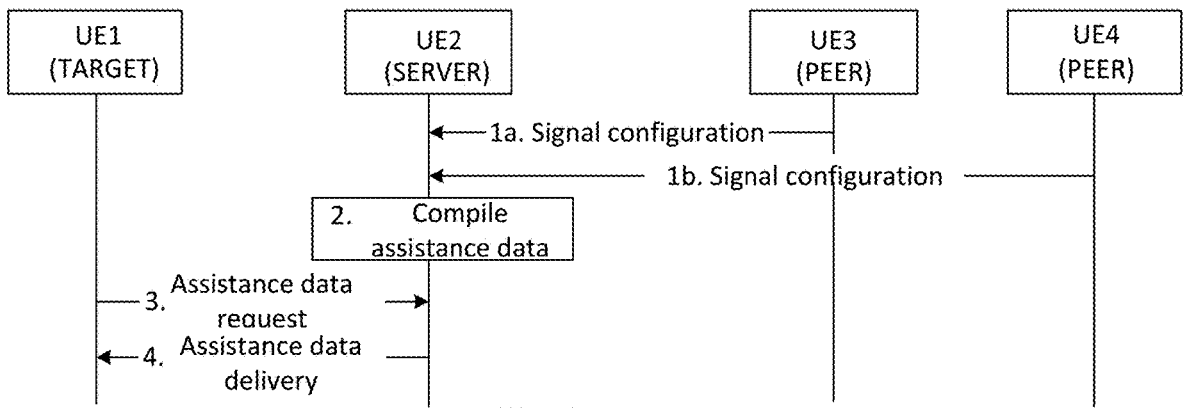
FIG. 4 shows a message flow for a server UE to compile assistance data based on signal configurations from peer UEs, and for a target UE to receive assistance data from the server UE to facilitate the measurements on the PC5 interface.

FIG. 4 shows a message flow for a to-be-positioned target UE to receive assistance data from a server UE to facilitate the measurements on the PC5 interface. The assistance data may contain, for example, information on the configuration of reference signals being transmitted by other peer UEs on the PC5 interface, the known locations of other peer UEs whose signals the target UE may measure, and so on. The assistance data may be distributed by an element of the cellular network in case the target UE is in cellular coverage, using existing techniques of the LPP protocol. Alternatively, the assistance data may be provided over the PC5 interface by one or more UEs. In one embodiment, the assistance data are provided to the UE to be positioned by a distinguished "server" UE, which may, for example, be the leader UE of a group, a UE-type RSU, a relay UE, and so on.

In FIG. 4, all communication between the UEs takes place over a sidelink interface. The messages may represent messages of various protocols, such as an LTE Positioning Protocol (LPP), NR Positioning Protocol A (NRPPa), and so on. UE1 in FIG. 4 is the UE to be positioned, functioning as a "target device" in the parlance of the LPP specification. UE2 in FIG. 4 includes the basic functionality of a positioning server; specifically, UE2 has the ability to collect configuration information from other peer UEs, compose corresponding assistance data, and distribute the assistance data to a target device (such as UE1). UE2 may have additional positioning server functionality such as the ability to compute a position estimate from measurements. UE3 and UE4 are additional UEs that may, for instance, transmit reference signals that can be measured by UE1 as part of the positioning process.

In steps 1a and 1b of FIG. 4, UE3 and UE4, respectively, inform UE2 of their configurations. The provided information may include, for example, configurations of positioning reference signals, known or estimated locations of UE3 and UE4 themselves, and any other information that needs to be provided to the server and/or the target device for a positioning operation. The provided information may be carried by messages of a protocol, such as LPP or NRPPa, for example. The messages of a protocol may be carried in a container in a message of a second protocol over the sidelink interface, such as a PC5 radio resource control (PC5-RRC) or PC5 signalling (PC5-S) protocol. In step 2, UE2 formulates positioning assistance data based on the information provided by UE3 and UE4; the assistance data may be in a format defined by a protocol, such as LPP, for example.

In step 3, UE1 requests assistance data from UE2. This step may be prompted by a request for a positioning operation at UE1 itself (for example, an application layer operating in UE1 may indicate a need for a location estimate), by an instruction from a positioning server such as the positioning server embodied in UE2, by a request from an external source, and so on. The request for assistance data may be in a format defined by a protocol, such as LPP, for example. The request for assistance data may be carried in a container in a message of a second protocol over the sidelink interface, such as a PC5-RRC or PC5-S protocol. In step 4, UE2 delivers assistance data to UE1 in response to the request from step 3. The assistance data delivered in step 4 may be identical to, a subset of, or a superset of the assistance data formulated in step 2. The server UE may determine what assistance data should be provided, taking into account any information it has about the environment of UE1, such as a coarse location estimate, measurement reports indicating the radio environment in relation to other UEs, and so on. The delivery of assistance data may be in a format defined by a protocol, such as LPP, for example. The delivery of assistance data may be carried in a container in a message of a second protocol over the sidelink interface, such as a PC5-RRC or PC5-S protocol.

Figure 5:
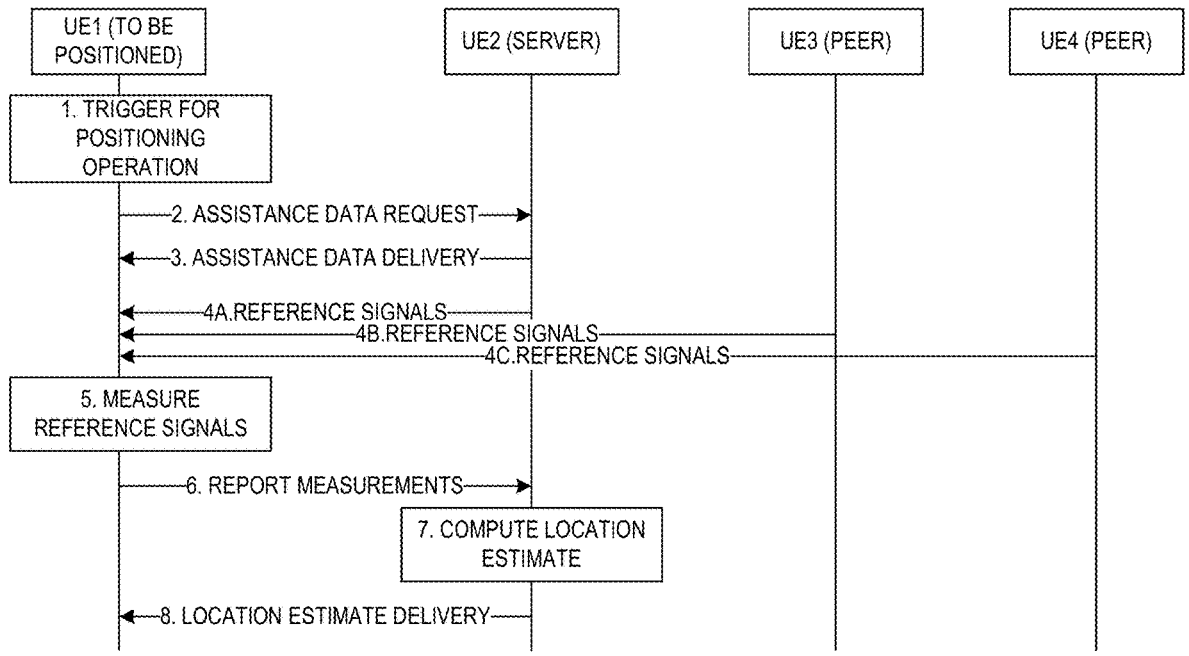
FIG. 5 shows an exemplary server-based positioning operation facilitated by a server UE and instigated by a target UE in accordance with one novel aspect.

FIG. 5 shows an exemplary server-based positioning operation with a first UE as the target device, a second UE as the positioning server, and third and fourth UEs as additional sources of reference signals. The procedure of FIG. 5 may be representative of a positioning method similar to the downlink positioning methods defined on the Uu interface, such as downlink time difference of arrival (DL-TDOA), downlink angle of departure (DL-AoD), and so on. In step 1 of FIG. 5, an event triggers UE1 to perform a positioning operation. The triggering event may be an indication from a user, an indication from an application layer operating in UE1, a message from another UE (for example, from UE2), a message from a cellular network element, and so on. The triggering event may identify UE2 as an appropriate device to use as a server for the requested positioning operation; alternatively, UE1 may select UE2 as a server based on any information known to UE1, such as configuration information identifying UE2 as a positioning server, advertisements of service from UE2, etc.

In step 2, UE1 requests assistance data from UE2 (similar to step 3 of FIG. 4). In step 3, UE2 provides assistance data to UE1 (similar to step 4 of FIG. 4). UE2 may have acquired the assistance data by various means, such as collection of configuration information from other UEs (similar to steps 1a and 1b of FIG. 4) or operations, administration, and management (OAM) configuration. A static or semi-static configuration of assistance data (such as through OAM) may be appropriate in case the UEs to be measured are substantially stationary (for example, UE-type RSUs). A dynamic configuration of assistance data (such as through reports from individual UEs) may be appropriate in case the UEs to be measured are mobile (for example, vehicular UEs). If assistance data are configured through reports from individual UEs, the reports may be in a format defined by a protocol, such as NRPPa, for example. In steps 4a, 4b, and 4c, UE2, UE3, and UE4, respectively, transmit reference signals on a sidelink interface. The UEs may transmit reference signals in response to a request, for example, from UE2 (not shown in the figure). Alternatively, the UEs may transmit reference signals on an ongoing basis, without an explicit request. Although FIG. 5 shows the reference signals as being transmitted directly to UE1, the reference signals may be transmitted in a broadcast or undirected fashion, such that they may be received by any UE in proximity. The reference signals may employ beamforming to provide directionality and additional range. Beamformed reference signals may further employ beam sweeping to ensure coverage of the surrounding area by directional beams.

In step 5, UE1 takes measurements on the received reference signals. The measurements may comprise timing measurements, measurements of reference signal received power (RSRP), measurements of reference signal received quality (RSRQ), or any other measurement that is feasible to perform on the reference signals and potentially useful in positioning UE1. In step 6, measurements taken in step 5 are reported to UE2 over the sidelink interface. The measurement reporting may be formatted as a message of a protocol, such as LPP. The message of a protocol may be transmitted in a container in a message of a second protocol, such as PC5-RRC or PC5-S. It is noted that the measurements may not provide enough information by themselves to determine the location of UE1; for example, the measurements may reflect the timing of transmissions from the measured UEs, but not include the locations of the measured UEs, which may be necessary to translate the timing information into a location estimate. In step 7, UE2, functioning as a positioning server, computes a location estimate based on the reported measurements from step 6, as well as on additional information that may be available to UE2 (such as the locations of the measured UEs, for example). In step 8, UE2 delivers the computed location estimate to UE1.

Figure 6:
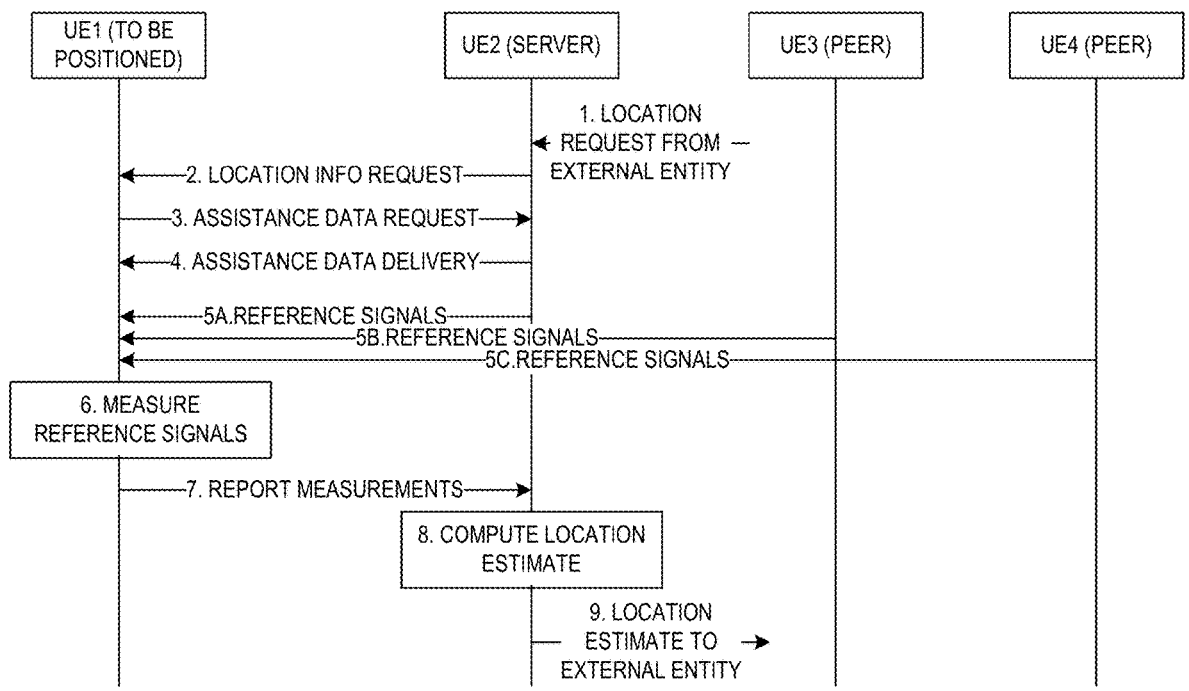
FIG. 6 shows an exemplary server-based positioning operation facilitated by a server UE and also instigated by the server UE in accordance with one novel aspect.

FIG. 6 shows a variation on the positioning procedure of FIG. 5. For example, the positioning operation may be triggered at UE2 rather than at UE1, potentially in response to a request from some external entity (e.g., a client in a cellular network that requires the location of UE1). In such a case, changes in the message flow are foreseeable. For example, steps 1 and 2 in FIG. 6 may be replaced by the arrival of a request from an external entity at UE2, prompting UE2 to request positioning measurements from UE1; steps 3 to 8 in FIG. 6 are the same as steps 2 to 7 in FIG. 5; and step 9 in FIG. 6 is the delivery of the location estimate to the external entity that requested it.

Figure 7:
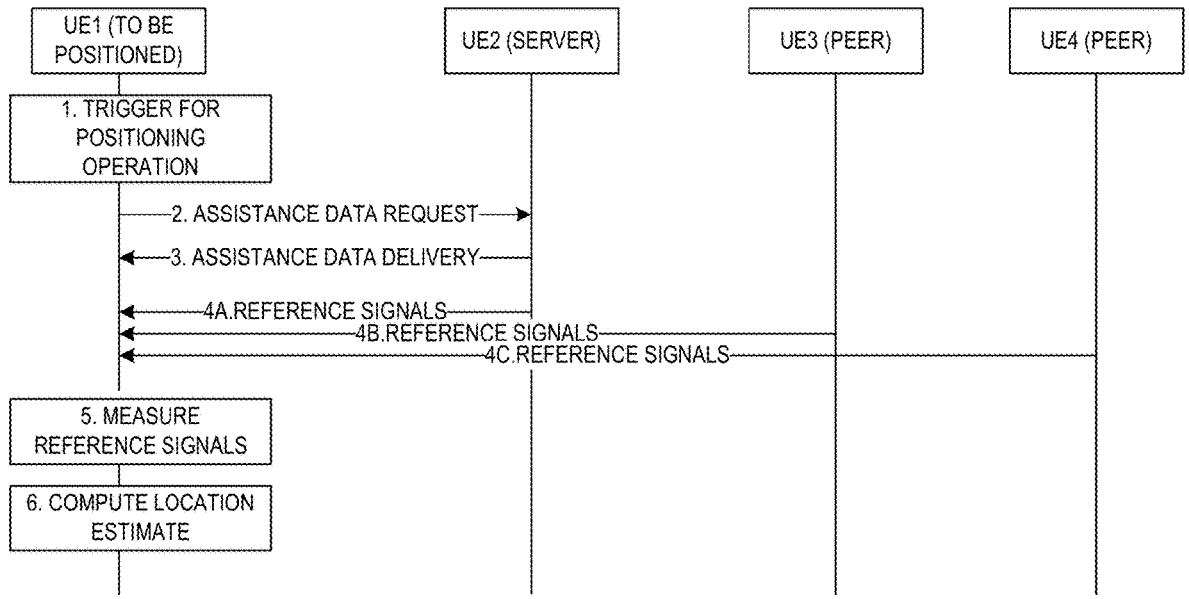
FIG. 7 shows an exemplary server-assisted positioning operation facilitated by a server UE in accordance with one novel aspect.

FIG. 7 shows a server-assisted positioning operation, analogous to the server-based version shown in FIG. 5 and FIG. 6. The message flows of FIGS. 5 and 6 represent "server-based" positioning, in the sense that the server UE (UE2 in FIG. 7) is responsible for the final computation of the location estimate. It is also possible to define a "server-assisted" approach to positioning, in which the server provides assistance data but the computation of the location estimate takes place at the UE to be positioned (UE1 in FIG. 7). This is analogous to the "UE-based" approach on the Uu interface; however, the "UE-based" terminology is not really appropriate for the sidelink, since all involved nodes are UEs, so the term "server-assisted" is adopted here instead. Equivalently, server-based positioning could be described as "target-assisted", and server-assisted positioning could be described as "target-based".

The initial steps 1 to 5 of FIG. 7 are the same as those in FIG. 5. In step 1, a positioning operation is triggered by some event, such as a request from upper layers. In steps 2 and 3, assistance data are transferred from UE2 (functioning as a server) to UE1 (functioning as a target device); the assistance data may have been obtained by UE2 through various methods, such as OAM configuration or transfer from the concerned UEs (e.g., UE3 and UE4). In steps 4a, 4b, and 4c, UE2, UE3, and UE4 transmit their respective reference signals, which are measured in step 5 by UE1. However, in step 6, rather than transferring the measurements to the server at UE2, UE1 makes use of information in the assistance data to compute its own location estimate. This computation may require additional information in the assistance data beyond what is needed for server-based positioning; for example, the assistance data may need to include the (estimated or known) locations of UE2, UE3, and/or UE4. The location estimate computed at UE1 can then be served to the entity that requested it, such as an application layer operating in UE1.

The positioning operations of FIG. 5, FIG. 6, and FIG. 7 are focused solely on the transmission of reference signals from the other UEs to the UE to be positioned (the equivalent of downlink reference signals on the Uu interface). Similar methodologies are also applicable when the UE to be positioned transmits reference signals to other UEs to be measured (the equivalent of uplink reference signals on the Uu interface). The reference signals to be transmitted by the UE to be positioned may be configured by a server UE. The server UE may also inform other UEs of when and how to measure the reference signals, and collect the subsequent measurements from the other UEs.

Figure 8:
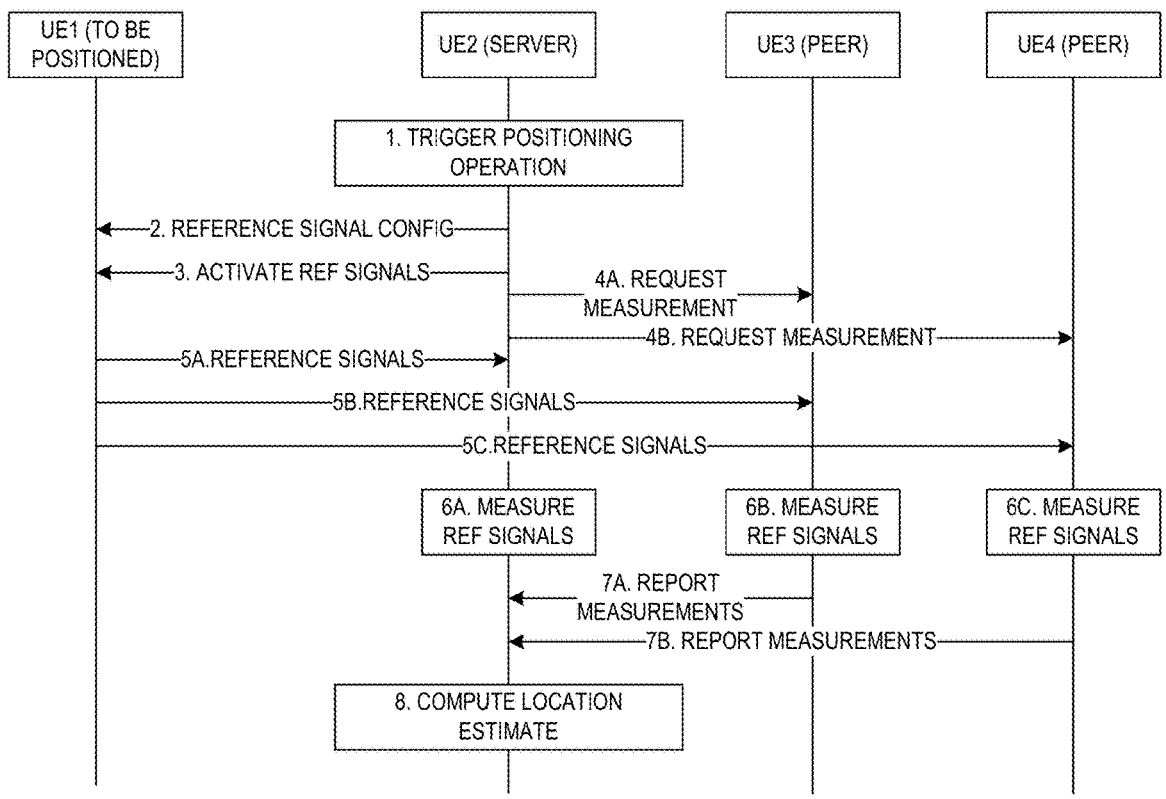
FIG. 8 shows an exemplary message flow of a positioning method where the reference signals are transmitted by a to-be-positioned UE.

FIG. 8 shows an exemplary message flow of a positioning method where the reference signals are transmitted by the to-be-positioned UE. The flow of FIG. 8 assumes that the positioning operation is triggered by the server UE (UE2 in FIG. 8). The triggering may be in response to a request from an external entity, a request from the UE to be positioned (UE1 in FIG. 8), an internal request from an application layer operating on UE2, a request from a client in a cellular network, or various other events. In step 1 of FIG. 8, UE2 triggers the positioning operation. In step 2, UE2 sends to UE1 a configuration of reference signals to be transmitted by UE1. The configuration may be sent by various protocols, such as LPP, PC5-RRC, or PC5-S, for example. UE1 may subsequently begin transmitting reference signals according to the configuration, or, optionally in step 3, UE2 may send a separate indication to activate the reference signals (analogous to the activation of sounding reference signal transmission on the Uu interface). The activation indication, if it occurs, may be carried by various protocols, such as LPP, PC5-RRC, PC5-S, or a PC5 medium access control (PC5-MAC) protocol.

In steps 4a and 4b of FIG. 8, UE2 sends indications to UE3 and UE4, respectively, to begin measuring the reference signals from UE1. The indications may be carried by various protocols, such as LPP or NRPPa, for example. In steps 5a, 5b, and 5c of FIG. 8, UE1 transmits the configured reference signals, which are received by UE2, UE3, and UE4. It should be appreciated that UE1 may transmit only a single set of reference signals, which are received and measured separately by the various other UEs. Alternatively, UE1 may transmit multiple instances of reference signals (for example, using beamforming in different transmission directions), and each of the other UEs may receive and measure only some of the multiple instances.

In steps 6a, 6b, and 6c of FIG. 8, UE2, UE3, and UE4, respectively, measure the reference signals. The measurements may comprise timing measurements, signal strength or quality measurements, and so on, similar to the different quantities that may be measured from the reference signals described in previous figures. In steps 7a and 7b of FIG. 8, UE3 and UE4, respectively, report their measurements to the server at UE2. The measurement reports may be carried by various protocols, such as LPP or NRPPa. In step 8, UE2 computes a location estimate based on the collected measurements. The location estimate may then be delivered to the entity that originally requested it (not shown in the figure). It should be appreciated that the steps of FIG. 8 may occur asynchronously or in a different order than illustrated; for instance, UE1 may begin transmitting reference signals (steps 5a, 5b, and 5c of FIG. 8) before UE2 has requested measurements (steps 4a and 4b of FIG. 8).

Figure 9:
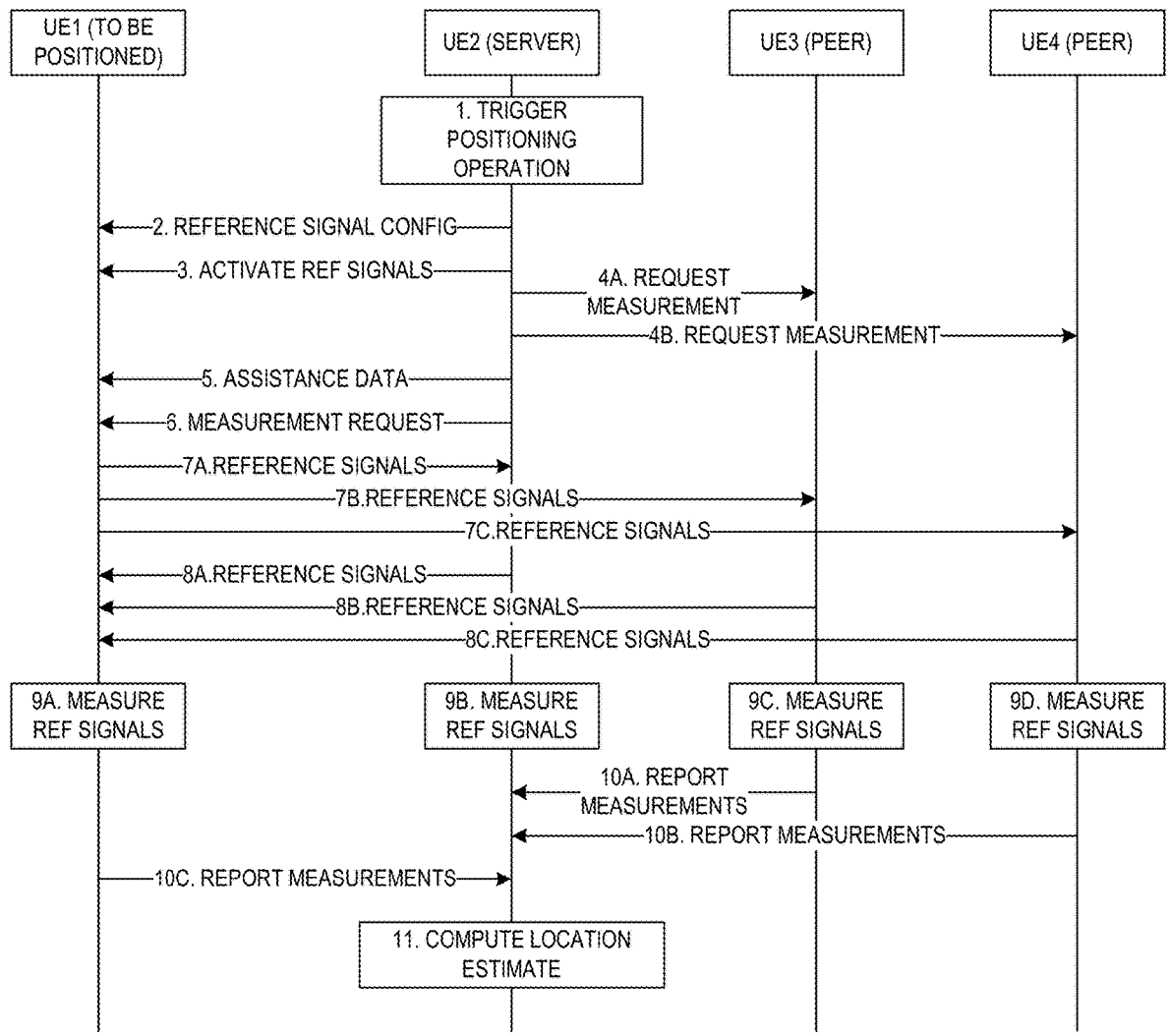
FIG. 9 shows an embodiment, where the use of reference signals from the peer and/or server UEs (as in FIGS. 5-7) and reference signals from the to-be-positioned UE (as in FIG. 8) may be combined at the server UE.

FIG. 9 shows an embodiment, where the use of reference signals from the peer UEs (as in FIGS. 5-7) and reference signals from the UE to be positioned (as in FIG. 8) may be combined. Such a combination may be needed, for example, to facilitate RTT measurements between UEs. In step 1 of FIG. 9, UE2 triggers a positioning operation. As in the previous figures, the source of the trigger may be any of various events, such as a request from UE1, a request from an external client, a request from an application layer operating on UE2, and so on. In step 2, UE2 configures UE1 with a set of reference signals to be transmitted by UE1; optionally, in step 3, it activates transmission of the reference signals, as in FIG. 8. In steps 4a and 4b, UE2 instructs UE3 and UE4, respectively, to measure the reference signals from UE1. These steps are all in accordance with the operations described in FIG. 8. However, in step 5, UE2 provides UE1 with assistance data to support measurements on reference signals sent by other UEs (for instance, UE2, UE3, and UE4), similar to the operations of FIGS. 5-7.

In step 6, UE2 requests UE1 to measure reference signals from UE2, UE3, and UE4. In steps 7a, 7b, and 7c, UE1 transmits reference signals that are measured by UE2, UE3, and UE4, respectively; in steps 8a, 8b, and 8c, UE2, UE3, and UE4, respectively, transmit reference signals that are measured by UE1. It should be noted that steps 7a, 7b, and 7c may represent a common transmission of reference signals from UE1, but the steps are shown separately because UE2, UE3, and UE4 receive the signals independently of one another. Alternatively, UE1 may transmit reference signals in a directed or beamformed fashion, in which case step 7a may represent transmission of reference signals in the (approximate) direction of UE2, step 7b may represent transmission of reference signals in the (approximate) direction of UE3, and step 7c may represent transmission of reference signals in the (approximate) direction of UE4. In steps 9a, 9b, 9c, and 9d, each of the UEs measures the corresponding reference signals that it receives: UE1 measures the reference signals from UE2, UE3, and UE4, while UE2, UE3, and UE4 measure the reference signals from UE1. The measurements to be taken may include timing measurements, directional measurements, signal strength measurements, and/or signal quality measurements; in particular, for application to determining an RTT between UE1 and a peer UE, the measurements to be taken may include a UE Rx-Tx time difference measurement. In steps 10a, 10b, and 10c, the various UEs report their measurements to the server at UE2. In step 11, UE2 computes a location estimate for UE1 based on the measurements it received from the other UEs, as well as any measurements UE2 itself may have taken. It should be appreciated that the set of UEs whose reference signals are measured by UE1 may not be identical to the set of UEs that measure reference signals from UE1.

Figure 10:
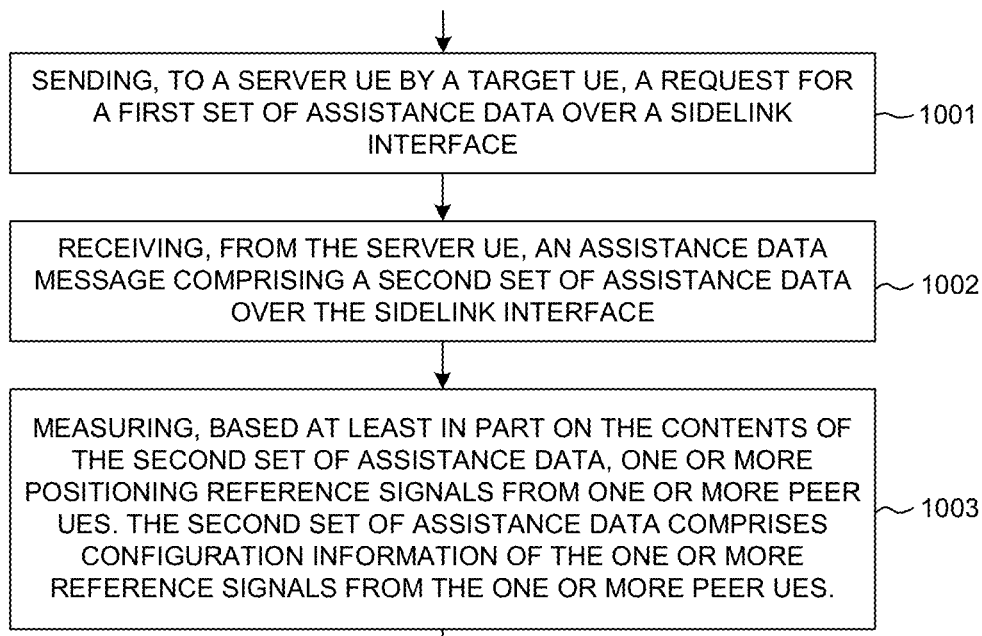
FIG. 10 is a flow chart of a method of target-initiated positioning for a target mobile device via sidelink interface in accordance with one novel aspect.

FIG. 10 is a flow chart of a method of target-initiated positioning for a target mobile device in accordance with one novel aspect. In step 1001, a target UE sends, to a server UE, a request for a first set of assistance data over a sidelink interface. In step 1002, the target UE receives, from the server UE, an assistance data message comprising a second set of assistance data over the sidelink interface. In step 1003, the target UE measures, based at least in part on the contents of the second set of assistance data, one or more positioning reference signals from one or more peer UEs. The second set of assistance data comprises configuration information of the one or more positioning reference signals from the one or more peer UEs.

Figure 11:
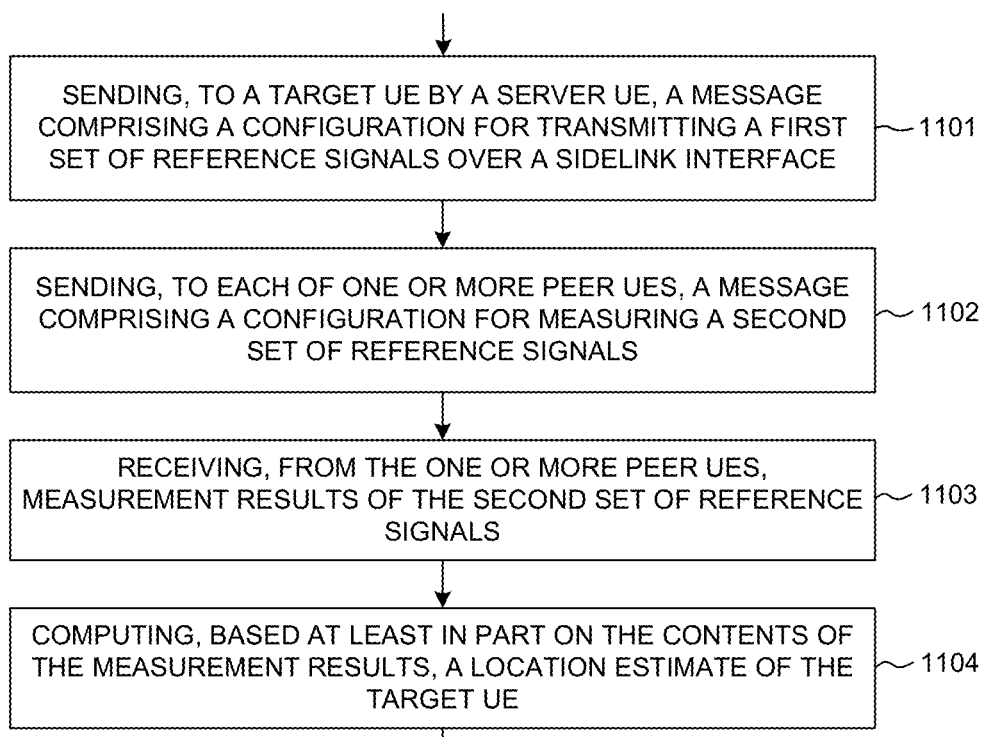
FIG. 11 is a flow chart of a method of server-based positioning with reference signals sent from a target mobile device via sidelink interface in accordance with one novel aspect.

FIG. 11 is a flow chart of a method of server-based positioning with reference signals sent from the target mobile device in accordance with one novel aspect. In step 1101, a server UE sends, to a target UE, a message comprising a configuration for transmitting a first set of reference signals over a sidelink interface. In step 1102, the server UE sends, to each of one or more peer UEs, a message comprising a configuration for measuring a second set of reference signals. In step 1103, the server UE receives, from the one or more peer UEs, measurement results of the second set of reference signals. In step 1104, the server UE computes, based at least in part on the contents of the measurement results, a location estimate for the target UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    sending, to a server user equipment (UE) by a target user equipment (UE), a request for a first set of assistance data over a sidelink interface;
    receiving, from the server UE, an assistance data message comprising a second set of assistance data over the sidelink interface;
    measuring, based at least in part on the contents of the second set of assistance data, one or more positioning reference signals from one or more peer UEs, wherein the second set of assistance data comprises configuration information of the one or more positioning reference signals from the one or more peer UEs; and
    reporting measurement results on the one or more positioning reference signals to the server UE.

2. The method of claim 1, further comprising:
    computing a location estimate for the target UE based at least in part on measurement results on the one or more positioning reference signals.

3. The method of claim 1, wherein the request for the first set of assistance data and the assistance data message are messages of an LTE positioning protocol (LPP) transmitted over the sidelink interface.

4. The method of claim 1, wherein the second set of assistance data comprises location information of the one or more peer UEs.

5. The method of claim 1, wherein the measuring involves measuring a timing characteristic of the one or more positioning reference signals.

6. The method of claim 1, wherein the sending of the request is triggered by receiving a location estimate request from the server UE.

7. A target User Equipment (UE) comprising:
    a transmitter that sends, to a server UE, a request for a first set of assistance data over a sidelink interface;
    a receiver that receives, from the server UE, an assistance data message comprising a second set of assistance data over the sidelink interface; and
    a measurement circuit that measures, based at least in part on the contents of the second set of assistance data, one or more positioning reference signals from one or more peer UEs, wherein the second set of assistance data comprises configuration information of the one or more positioning reference signals from the one or more peer UEs, wherein the target UE reports measurement results on the one or more positioning reference signals to the server UE.

8. The UE of claim 7, further comprising:
    a location estimation circuit that computes a location estimate for the target UE based at least in part on measurement results on the one or more positioning reference signals.

9. The UE of claim 7, wherein the request for the first set of assistance data and the assistance data message are messages of an LTE positioning protocol (LPP) transmitted over the sidelink interface.

10. The UE of claim 7, wherein the second set of assistance data comprises location information of the one or more peer UEs.

11. The UE of claim 7, wherein the measuring involves measuring a timing characteristic of the one or more reference signals.

12. The UE of claim 7, wherein the sending of the request is triggered by receiving a location estimate request from the server UE.

13. A method, comprising:
- sending, to a target user equipment (UE) by a server user equipment (UE), a message comprising a configuration for transmitting a first set of reference signals over a sidelink interface;
- sending, to each of one or more peer UEs, a message comprising a configuration for measuring a second set of reference signals;
- receiving, from the one or more peer UEs, measurement results of the second set of reference signals; and
- computing, based at least in part on the contents of the measurement results, a location estimate for the target UE.

14. The method of claim 13, wherein the message comprising the configuration for transmitting the first set of reference signals is a message of an LTE positioning protocol (LPP) transmitted over the sidelink interface.

15. The method of claim 13, wherein the message comprising the configuration for transmitting the first set of reference signals is a message of a PC5 radio resource control (PC5-RRC) protocol transmitted over the sidelink interface.

16. The method of claim 13, wherein the message comprising the configuration for transmitting the first set of reference signals is a message of an NR positioning protocol A (NRPPa) transmitted over the sidelink interface.

17. The method of claim 13, wherein the message comprising the configuration for measuring the second set of reference signal is a message of LTE positioning protocol (LPP) or NR positioning protocol A (NRPPa).

18. The method of claim 13, further comprising:
- sending, to the target UE, an instruction to activate the first set of reference signals over PC5 radio resource control (PC5-RRC) or Media Access Control (MAC).

* * * * *